United States Patent
Ito et al.

(10) Patent No.: US 9,026,293 B2
(45) Date of Patent: May 5, 2015

(54) DRIVE CONTROL DEVICE OF HYBRID VEHICLE

(75) Inventors: Yoshiki Ito, Hamamatsu (JP); Masaaki Tagawa, Hamamatsu (JP); Masakazu Saito, Hamamatsu (JP); Hitoshi Ohkuma, Hamamatsu (JP); Yukihiro Hosoe, Hamamatsu (JP)

(73) Assignee: Suzuki Motor Corporation, Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/985,692

(22) PCT Filed: Feb. 21, 2011

(86) PCT No.: PCT/JP2011/053690
§ 371 (c)(1),
(2), (4) Date: Nov. 26, 2013

(87) PCT Pub. No.: WO2012/114430
PCT Pub. Date: Aug. 30, 2012

(65) Prior Publication Data
US 2014/0081500 A1    Mar. 20, 2014

(51) Int. Cl.
*B60L 9/00* (2006.01)
*B60W 10/00* (2006.01)
(Continued)

(52) U.S. Cl.
CPC ............ *B60W 20/10* (2013.01); *Y02T 10/6286* (2013.01); *Y02T 10/92* (2013.01); *Y02T 10/6239* (2013.01); *B60K 6/445* (2013.01); *B60W 10/06* (2013.01); *B60W 10/08* (2013.01); *B60W 10/26* (2013.01); *B60K 6/365* (2013.01);
(Continued)

(58) Field of Classification Search
USPC .................. 701/22; 180/65.265; 320/107
See application file for complete search history.

(56) References Cited

U.S. PATENT DOCUMENTS 7,097,586 B2 *  8/2006  Joe et al. .......................... 477/3
7,219,757 B2 *  5/2007  Tomita et al. ............ 180/65.275
(Continued)

FOREIGN PATENT DOCUMENTS

JP    2004-262275 A    9/2004
JP    2005-16570 A     1/2005
(Continued)

OTHER PUBLICATIONS

Form PCT/ISA/210 International Search Report issued in International Application No. PCT/JP2011/053690 with English translation, date of mailing Jun. 14, 2011 (5 pages).

*Primary Examiner* — Thomas G Black
*Assistant Examiner* — Tyler Paige
(74) *Attorney, Agent, or Firm* — Flynn, Thiel, Boutell & Tanis, P.C.

(57) ABSTRACT

A drive control device of a hybrid vehicle in which an electric power loss predictor and a target electric power calculator are arranged, a target engine power calculator calculates a target engine power based on a target driving power, target charging/discharging power, and estimated power that is an electric power loss, and a motor torque instruction value calculator calculates the torque instruction values of a plurality of motor generators using a torque balance equation including the target engine torque and an electric power balance equation including the target electric power. In the electric power balance equation, the electric power generated or consumed by the plurality of motor generators, the estimated power that is the electric power loss, and input/output electric power of the battery are included.

4 Claims, 10 Drawing Sheets

(51) Int. Cl.
*H02J 7/00* (2006.01)
*B60W 20/00* (2006.01)
*B60K 6/445* (2007.10)
*B60W 10/06* (2006.01)
*B60W 10/08* (2006.01)
*B60W 10/26* (2006.01)
*B60K 6/365* (2007.10)
*B60W 30/188* (2012.01)
*B60L 11/12* (2006.01)
*B60L 11/18* (2006.01)
*B60L 15/02* (2006.01)

(52) U.S. Cl.
CPC ..... *B60W30/1882* (2013.01); *B60W 2510/244* (2013.01); *B60W 2520/10* (2013.01); *B60W 2540/10* (2013.01); *Y02T 10/56* (2013.01); *B60L 11/123* (2013.01); *B60L 11/1862* (2013.01); *B60L 15/02* (2013.01); *B60L 2240/545* (2013.01); *Y10S 903/93* (2013.01); *Y02T 10/7077* (2013.01); *Y02T 10/7044* (2013.01); *Y02T 10/7005* (2013.01); *Y02T 10/705* (2013.01); *Y02T 10/6217* (2013.01); *Y02T 10/84* (2013.01)

(56) References Cited

U.S. PATENT DOCUMENTS

| | | | | |
|---|---|---|---|---|
| 7,878,281 | B2 * | 2/2011 | Tanishima | 180/65.265 |
| 8,002,059 | B2 * | 8/2011 | Tanishima | 180/65.275 |
| 8,082,073 | B2 | 12/2011 | Okamura et al. | |
| 8,818,604 | B2 * | 8/2014 | Tagawa et al. | 701/22 |
| 2007/0102208 | A1 * | 5/2007 | Okuda et al. | 180/65.3 |
| 2008/0109142 | A1 * | 5/2008 | Endo | 701/54 |
| 2009/0030626 | A1 * | 1/2009 | Iwane et al. | 702/63 |
| 2009/0248229 | A1 | 10/2009 | Okamura et al. | |
| 2011/0313602 | A1 * | 12/2011 | Hirata et al. | 701/22 |
| 2012/0043929 | A1 * | 2/2012 | Yazami | 320/107 |
| 2013/0307329 | A1 * | 11/2013 | Ito et al. | 307/10.1 |
| 2013/0311029 | A1 * | 11/2013 | Tagawa et al. | 701/22 |

FOREIGN PATENT DOCUMENTS

| | | |
|---|---|---|
| JP | 2007-22483 A | 2/2007 |
| JP | 2007-99244 A | 4/2007 |
| JP | 2008-12992 A | 1/2008 |
| JP | 2008-193762 A | 8/2008 |
| JP | 2009-100542 A | 5/2009 |
| JP | 2010-273520 A | 12/2010 |

* cited by examiner

TARGET DRIVING FORCE SEARCH MAP

TARGET CHARGE/DISCHARGE POWER SEARCH TABLE

TARGET ENGINE OPERATING POINT SEARCH MAP

ALIGNMENT CHART IN CASE WHERE VEHICLE SPEED
CHANGES AT SAME ENGINE OPERATING POINT

LINE IN WHICH ENGINE EFFICIENCY IS HIGHEST AND
LINE IN WHICH TOTAL EFFICIENCY IS HIGHEST

ALIGNMENT CHART IN STATE OF LOW GEAR RATIO

ALIGNMENT CHART IN STATE OF
INTERMEDIATE GEAR RATIO

ALIGNMENT CHART IN STATE OF
HIGH GEAR RATIO

ALIGNMENT CHART IN STATE IN WHICH
CIRCULATION OF POWER OCCURS

POWER UPPER LIMIT/LOWER LIMIT VALUE SEARCH
TABLE ACCORDING TO BATTERY TEMPERATURE

POWER UPPER LIMIT/LOWER LIMIT VALUE SEARCH TABLE
ACCORDING TO BATTERY VOLTAGE

POWER UPPER LIMIT/LOWER LIMIT VALUE SEARCH TABLE
ACCORDING TO SOC

DRIVE CONTROL DEVICE OF HYBRID VEHICLE

TECHNICAL FIELD

The present invention relates to a drive control device of a hybrid vehicle that includes a plurality of power sources, combines the power thereof using a differential gear mechanism, and inputs or outputs the power to a driving shaft, and more particularly, to a drive control device of a hybrid vehicle that improves the control accuracy of the charged state of a battery by controlling the engine operating point of an internal combustion engine and the torques of motor generators in consideration of an electric power loss of the motor generators and prevents the battery from being excessively loaded.

BACKGROUND ART

Conventionally, as a form of a hybrid vehicle including an electric motor and an internal combustion engine other than a serial form and a parallel form, as disclosed in U.S. Pat. Nos. 3,050,125, 3,050,138, 3,050,141, 3,097,572, and the like, there is a form in which the torque of the power of the internal combustion engine is converted by dividing the power of the internal combustion engine to a power generator and a driving shaft using one planetary gear mechanism (a differential gear mechanism having three rotating components) and two electric motors and driving an electric motor arranged at the driving shaft by using electric power generated by the power generator. This will be referred to as a "three-axis type".

According to this conventional technology, the engine operating point of the internal combustion engine can be set to an arbitrary point including stop, and accordingly, the fuel efficiency can be improved. However, although not as much as for the serial form, since an electric motor having relatively sufficiently high torque is necessary for acquiring sufficient driving-shaft torque, and the amount of transmission and reception of electric power between the power generator and the electric motor increases in a low gear ratio region, the electric loss increases, and there is still room for improvement.

As methods for solving this point, there are methods disclosed in U.S. Pat. No. 3,578,451 and Japanese Patent Application Publication Laid-Open (JP-A) No. 2004-15982, and JP-A Nos. 2002-281607 and 2008-12992 applied by the applicants of the present invention.

In the method disclosed in JP-A No. 2002-281607, a driving shaft connected to an output shaft of an internal combustion engine, a first motor generator (hereinafter, referred to as "MG1"), a second motor generator (hereinafter, referred to as "MG2"), and a drive wheel is connected to each rotating component of a differential gear mechanism having four rotating components, the power of the internal combustion engine and the power of the MG1 and MG2 are combined, and the combined power is output to the driving shaft.

In addition, in the method disclosed in JP-A No. 2002-281607, by arranging an output shaft of an internal combustion engine and a drive shaft connected to a drive wheel in a rotating component arranged on the inner side on an alignment chart and arranging the MG1 (the internal combustion engine side) and MG2 (the driving shaft side) in a rotating component disposed on the outer side on the alignment chart, the ratio of power that is in charge of the MG1 and MG2 to the power delivered to the driving shaft from the internal combustion engine can decrease, whereby the MG1 and MG2 can be miniaturized, and the transmission efficiency of the driving device can be improved. This will be referred to as a "four-axis type".

In addition, a method disclosed in U.S. Pat. No. 3,578,451 similar to the above-described method has been proposed, in which an additional fifth rotating component is included, and a brake stopping this rotating component is arranged.

In JP-A No. 2008-12992, in a drive control device of a hybrid vehicle including an internal combustion engine and a plurality of motor generators, a technology for controlling the internal combustion engine has been disclosed in which the engine rotation speed is set high at the engine operating point of the internal combustion engine.

In the above-described conventional technology, as disclosed in U.S. Pat. No. 3,050,125, the power to be output by the internal combustion engine is calculated by adding the driving force required for the vehicle and the electric power required for charging a battery, and, out of a combination of the engine torque and the engine rotation speed corresponding to the power, a point at which the efficiency is high as possibly as can is calculated and is set as a target engine operating point. Then, the engine rotation speed is controlled by controlling the MG1 such that the engine operating point of the internal combustion engine becomes the target operating point.

CITATION LIST

Patent Literature

PTL 1 U.S. Pat. No. 3,050,125
PTL 2 U.S. Pat. No. 3,050,138
PTL 3 U.S. Pat. No. 3,050,141
PTL 4 U.S. Pat. No. 3,097,572
PTL 5 U.S. Pat. No. 3,578,451
PTL 6 JP-A No. 2004-15982
PTL 7 JP-A No. 2002-281607
PTL 8 JP-A No. 2008-12992

SUMMARY OF INVENTION

Technical Problem

However, in a conventional drive control device of a hybrid vehicle, in the case of the "three-axis type", the torque of the MG2 does not have an effect on the torque balance. Accordingly, torque output from the driving shaft by the internal combustion engine and the MG1 is calculated based on the torque of the MG1 wherein the torque of the MG1 is feedback-controlled so as to allow the engine rotation speed to approach a target value, and the torque of the MG2 is controlled so as to have a value acquired by subtracting the calculated value from a target driving force, whereby the target driving force can be output from the driving shaft even in a case where the engine torque changes.

However, in the case of the "four-axis type", the driving shaft and the MG2 form mutually-different shafts, and the torque of the MG2 influences the torque balance so as to have an effect on the control of the engine rotation speed, and accordingly, there is a disadvantage that the control method of the "three-axis type" cannot be used.

In addition, in JP-A No. 2004-15982, which is a case of the "four-axis type", a method for controlling the engine rotation speed and the driving force has been disclosed in which the torques of the MG1 and the MG2 in a case of driving without charging or discharging a battery are calculated using a torque balance equation, and the feedback control of the rotation speeds of the MG1 and MG2 is performed.

However, in JP-A No. 2004-15982 described above, a case where the battery is charged or discharged and a case where the engine torque changes have not been mentioned.

In JP-A No. 2008-12992 described above, while the technology for controlling an internal combustion engine has been disclosed in which the engine rotation speed is set high at the operating point of the internal combustion engine, the control of a plurality of motor generators is not clear, and the control of a plurality of motor generators in a case where the battery is charged and discharged is not clear.

In JP-A No. 2008-12992 described above, the internal combustion engine and a plurality of motor generators are mechanically operated to be connected to each other, and it is necessary to perform control with the plurality of motor generators being associated with each other so as to balance the torque thereof while the operating point of the internal combustion engine is maintained at a target value, and, in a case where the battery is charged and discharged, the electric power needs to be balanced. In other words, it is necessary to perform control such that both the torque and the electric power of the plurality of motor generators are balanced.

In addition, in JP-A No. 2008-12992 described above, when the torque is controlled to be balanced with a plurality of motor generators being associated with each other, even in a case where feedback control is performed, there is the inconvenience that a change in the torque of the internal combustion engine influences the driving torque depending on the content of the control process.

Thus, the applicants for the present invention invented a drive control device in which, in a hybrid vehicle driving a driving shaft connected to drive wheels by combining the output of an internal combustion engine and the power of MG1 and MG2, target driving power is acquired based on a target driving force having the degree of the opening of the accelerator and the vehicle speed as parameters and the vehicle speed, target charging/discharging power is acquired based on the charged state SOC of the battery, an electric power loss is predicted based on the vehicle speed and the target driving force, target engine power is calculated by adding the target electric power and the electric power loss to the target driving power, a target engine operating point is acquired based on the target engine power, target electric power that is a target value of input/output electric power of the battery is acquired based on a difference between the target driving power and the target engine power, and control instruction values (torque instruction values) of the torque of the MG1 and the torque of the MG2 are calculated using a torque balance equation including the target engine torque and an electric power balance equation including the target electric power.

According to this method, since the target engine power is calculated in consideration of the electric power loss, power generation can be performed so as to control the charge state SOC of the battery within a predetermined range more precisely while the target driving force is output.

However, in a case where the target driving power is higher than the target engine power, in other words, in a case where the target engine power is limited by the power upper limit of the internal combustion engine, power assistance using the electric power of the battery is performed. However, in such a case, even when the target engine power is calculated in consideration of the electric power loss, the target engine power is limited by the upper limit power of the internal combustion engine, and accordingly, the electric power loss is not reflected on the target electric power. Accordingly, in the case as described above, the electric power corresponding to the electric power loss is unnecessarily consumed, and there is a problem in that the battery is over-discharged, or the limit of the discharge electric power of the battery is exceeded.

In addition, in a case where the battery is charged by regenerative braking at the time of deceleration, when the torque of the MG1 and MG2 is limited based on only the input limit of the battery, the electric power that is actually used for charging is electric power that is lower than the input limit by the electric power loss. Accordingly, there is a problem in that the electric power regeneration according to the deceleration is not sufficiently used.

In order to solve such problems, a method may be considered in which the target electric power is limited in a range of values acquired by subtracting the electric power loss from the input/output limit power of the battery. However, since the electric power loss is predicted based on the vehicle speed and the target driving force, the accuracy is not sufficient, and a technique having higher accuracy is desired. Here, the reason for predicting the electric power loss based on the vehicle speed and the target driving force is that it is necessary to predict the electric power loss before the target engine power is acquired, and, at that time point, the target engine operating point and the target rotation speeds and the target torques of the MG1 and MG2 are not calculated.

Objects of the present invention is to improve the control accuracy of the charged state of the battery in consideration of the electric power losses of a plurality of motor generators and, in accordance therewith, to secure the protection performance of the battery, and to increase the energy recovery efficiency according to the regeneration.

Solution to Problem

According to the present invention, there is provided a drive control device of a hybrid vehicle including: an internal combustion engine that includes an output shaft; a driving shaft that is connected to a drive wheel; first and second motor generators; a differential gear mechanism that includes four rotating components connected to a plurality of the motor generators, the driving shaft, and the internal combustion engine; an accelerator opening degree detecting means that detects the accelerator opening degree; a vehicle speed detecting means that detects a vehicle speed; a battery charge state detecting means that detects a charged state of a battery; a target driving power setting means that sets a target driving power based on the accelerator opening degree that is detected by the accelerator opening degree detecting means and the vehicle speed detected by the vehicle speed detecting means; a target charging/discharging power setting means that sets a target charging/discharging power based on at least the charged state of the battery that is detected by the battery charge state detecting means; a target engine power calculating means that calculates a target engine power based on the target driving power of the target driving power setting means and the target charging/discharging power of the target charging/discharging power setting means; a target engine operating point setting means that sets a target engine operating point based on the target engine power and total system efficiency; a motor torque instruction value calculating means that calculates target rotation speeds of the plurality of the motor generators and sets torque instruction values of the motor generators; an electric power loss predicting means that calculates an estimated power that is an electric power loss based on the target rotation speeds and the torque instruction values of the plurality of the motor generators; and a target electric power calculating means that calculates a target electric power based on a difference between the target engine power calculated by the target engine power calculating means and the target driving power. The target engine power calculating means calculates the target engine power based on the target driving power, the target charging/discharging power, and the estimated power that is the electric power loss, the motor torque instruction value calculating means calculates torque instruction values of the plurality of motor generators using a torque balance equation including a target engine torque acquired at the target engine operating point and an electric power balance equation including the target electric power, and electric power generated or consumed by the plurality of the motor generators, the estimated power that is the electric power loss in the plurality of motor generators, and input/output electric power of the battery are included in the electric power balance equation.

Advantageous Effects of Invention

According to the present invention, by limiting the input/output power according to the state of the battery in consideration of the electric power losses of a plurality of motor generators, the charging/discharging electric power can be appropriately limited in a case where power assistance is performed using the electric power of the battery, whereby overdischarging or overloading of the battery can be prevented.

According to the present invention, since the control accuracy of the SOC of the battery can be improved in consideration of the electric power losses of the plurality of motor generators, the control accuracy is high, and a range near the limit value of the battery can be used, whereby the amount of regeneration at the time of deceleration can be increased.

According to the present invention, the calculation is performed with the electric power loss being included in the electric power balance equation, and accordingly, the control accuracy of the distribution of the driving force to the plurality of motor generators can be increased.

According to the present invention, both the target driving force of the motor generator and the charge/discharge near the target preventing overcharging/overdischarging of the battery can be secured in consideration of the operating point of the internal combustion engine. In addition, according to the present invention, after the target engine rotation speed is reset so as not to exceed the upper limit value of the target engine rotation speed, a target electric power different from the target charging/discharging power is set based on the target engine rotation speed, and the driving forces of the plurality of motor generators are set based on the optimized target engine operating point and the optimal target electric power preventing overcharging/overdischarging, whereby the internal combustion engine is protected by limiting the engine rotation speed, and the driving force requested by the driver can be satisfied based on the power assistance using the electric power of the battery.

DESCRIPTION OF EMBODIMENTS

Hereinafter, an embodiment of the present invention will be described with reference to the drawings.

Figure 1:
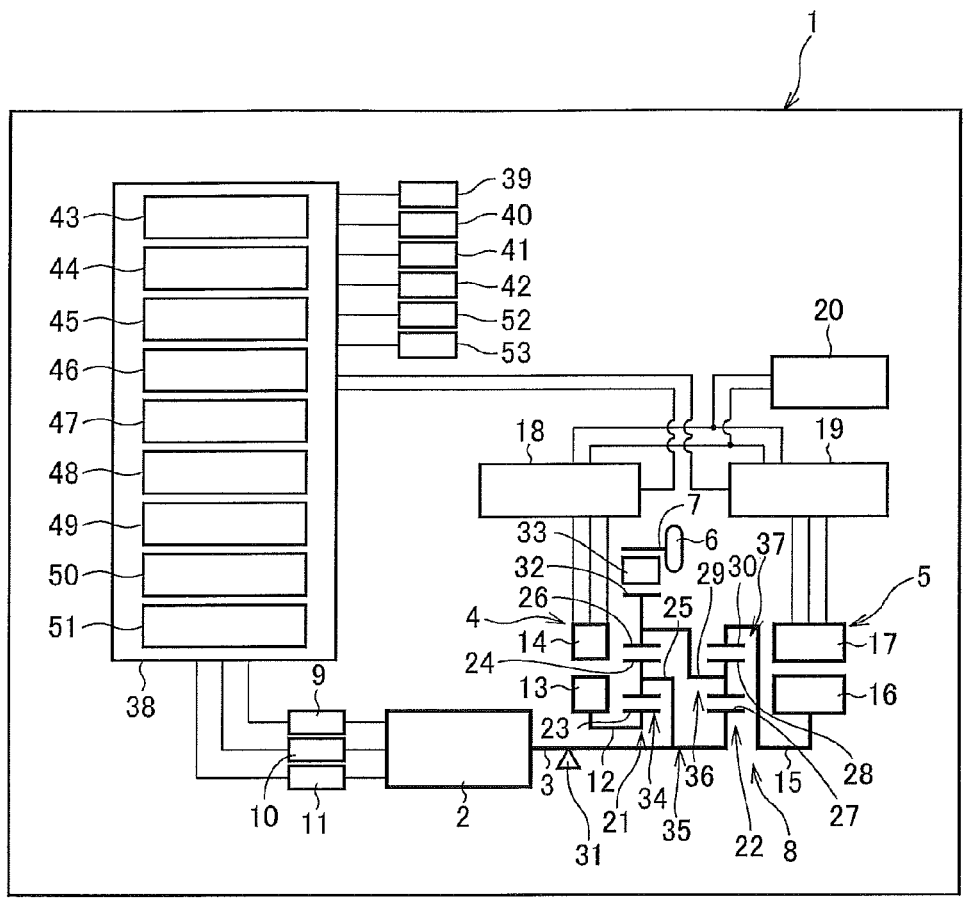
FIG. 1 is a system configuration diagram of a drive control device of a hybrid vehicle.

FIGS. 1 to 19 illustrate an embodiment of the present invention. In FIG. 1, reference numeral 1 represents a drive control device of a hybrid vehicle. The drive control device 1 of the hybrid vehicle, as a driving system, includes: an output shaft 3 of an internal combustion engine 2 that generates a driving force in accordance with the combustion of fuel; a first motor generator 4 and a second motor generator 5 that generate a driving force using electricity and generate electrical energy through driving; a driving shaft 7 that is connected to a drive wheel 6 of the hybrid vehicle, and a differential gear mechanism 8 that is a power transmission system connected to the output shaft 3, the first and second motor generators 4 and 5, and the driving shaft 7.

The internal combustion engine 2 includes: an air content adjusting means 9 such as a throttle valve that adjusts the air volume to be suctioned in accordance with the accelerator opening degree (the amount of pressing an accelerator pedal using a foot); a fuel supplying means 10 such as a fuel injection valve that supplies fuel corresponding to the suctioned air volume; and an ignition means 11 such as an ignition device that ignites the fuel. In the internal combustion engine 2, the combustion state of the fuel is controlled by the air content adjusting means 9, the fuel supplying means 10, and the ignition means 11, and a driving force is generated by the combustion of the fuel.

The first motor generator 4 includes: a first motor rotor shaft 12; a first motor rotor 13; and a first motor stator 14. The second motor generator 5 includes: a second motor rotor shaft 15; a second motor rotor 16; and a second motor stator 17. The first motor stator 14 of the first motor generator 4 is connected to a first inverter 18. The second motor stator 17 of the second motor generator 5 is connected to a second inverter 19.

The power terminals of the first and second inverters 18 and 19 are connected to a battery 20. The battery 20 is an electricity accumulating means that can exchange electric power between the first motor generator 4 and the second motor generator 5. The first motor generator 4 and the second motor generator 5 generate driving forces in accordance with electricity of which the amount of electricity supplied from the battery 20 is controlled by the first and second inverters 18 and 19 and generate electrical energy using the driving force supplied from the drive wheel 6 at the time of regeneration and store the generated electrical energy in the battery 20 to be charged.

The differential gear mechanism 8 includes a first planetary gear mechanism 21 and a second planetary gear mechanism 22. The first planetary gear mechanism 21 includes: a first sun gear 23; a first planetary carrier 25 supporting a first planetary gear 24 engaged with the first sun gear 23; and a first ring gear 26 that is engaged with the first planetary gear 24. The second planetary gear mechanism 22 includes: a second sun gear 27; a second planetary carrier 29 supporting the second planetary gear 28 engaged with the second sun gear 27; and a second ring gear 30 that is engaged with the second planetary gear 28.

The differential gear mechanism 8 arranges the rotational center lines of rotating components of the first planetary gear mechanism 21 and the second planetary gear mechanism 22 on the same axis, arranges the first motor generator 4 between the internal combustion engine 2 and the first planetary gear mechanism 21, and arranges the second motor generator 5 on a side of the second planetary gear mechanism 22 that is separated away from the internal combustion engine 2. The second motor generator 5 has a performance capable of driving the vehicle using only the output thereof.

The first motor rotor shaft 12 of the first motor generator 4 is connected to the first sun gear 23 of the first planetary gear mechanism 21. The first planetary carrier 25 of the first planetary gear mechanism 21 and the second sun gear 27 of the second planetary gear mechanism 22 are connected to the output shaft 3 of the internal combustion engine 2 in a combined manner through a one-way clutch 31. The first ring gear 26 of the first planetary gear mechanism 21 and the second planetary carrier 29 of the second planetary gear mechanism 22 are combined and are connected to an output unit 32. The output unit 32 is connected to the driving shaft 7 through an output transmission mechanism 33 such as a gear or a chain. The second motor rotor shaft 15 of the second motor generator 5 is connected to the second ring gear 30 of the second planetary gear mechanism 9.

The one-way clutch 31 is a mechanism that fixes the output shaft 3 of the internal combustion engine 2 so as to rotate only in the output direction and prevents the output shaft 3 of the internal combustion engine 2 from reversely rotating. The driving power of the second motor generator 5 is transmitted as driving power of the output unit 32 through a reaction force of the one-way clutch 31.

The hybrid vehicle outputs the power generated by the internal combustion engine 2 and the first and second motor generators 4 and 5 to the driving shaft 7 through the first and second planetary gear mechanisms 21 and 21, thereby driving the drive wheel 6. In addition, the hybrid vehicle transmits the driving force delivered from the drive wheel 6 to the first and second motor generators 4 and 5 through the first and second planetary gear mechanisms 21 and 22, thereby generating electrical energy so as to charge the battery 20.

The differential gear mechanism 8 sets four rotating components 34 to 37. The first rotating component 34 is formed by the first sun gear 23 of the first planetary gear mechanism 21. The second rotating component 35 is formed by combining the first planetary carrier 25 of the first planetary gear mechanism 21 and the second sun gear 27 of the second planetary gear mechanism 22. The third rotating component 36 is formed by combining the first ring gear 26 of the first planetary gear mechanism 21 and the second planetary carrier 29 of the second planetary gear mechanism 22. The fourth rotating component 37 is formed by the second ring gear 30 of the second planetary gear mechanism 22.

The differential gear mechanism 8, as illustrated in FIGS. 9 and 12 to 16, on an alignment chart in which the rotation speeds of the four rotating components 34 to 37 can be represented as a straight line, sets the four rotating components 34 to 37 as the first rotating component 34, the second rotating component 35, the third rotating component 36, and the fourth rotating component 37 from one end (the left side in each figure) toward the other end (the right side in each figure). A ratio of distances among the four rotating components 34 to 37 is represented as k1:1:k2. In each figure, MG1 represents the first motor generator 4, MG2 represents the second motor generator 5, ENG represents the internal combustion engine 2, and OUT represents the output unit 32.

The first motor rotor shaft 12 of the first motor generator 4 is connected to the first rotating component 34. The output shaft 3 of the internal combustion engine 2 is connected to the second rotating component 35 through the one-way clutch 31. The output unit 32 is connected to the third rotating component 36. The driving shaft 7 is connected to the output unit 32 through the output transmission mechanism 33. The second motor rotor shaft 15 of the second motor generator 5 is connected to the fourth rotating component 37.

From this, the differential gear mechanism 8 includes the four rotating components 34 to 37 connected to the output shaft 3, the first motor generator 4, the second motor generator 5, and the driving shaft 7 and transmits power and receives power to/from the output shaft 3 of the internal combustion engine 2, the first motor generator 4, the second motor generator 5, and the driving shaft 7. Accordingly, the drive control device 1 employs the control form of the "four-axis type".

The hybrid vehicle 1 connects the air content adjusting means 9, the fuel supplying means 10, the ignition means 11, the first inverter 18, and the second inverter 19 to the drive control unit 38. In addition, an accelerator opening degree detecting means 39, a vehicle speed detecting means 40, an engine rotation speed detecting means 41, and a battery charge state detecting means 42 are connected to the drive control unit 38.

The accelerator opening degree detecting means 39 detects the accelerator opening degree that is the amount of pressing the accelerator pedal using a foot. The vehicle speed detecting means 40 detects a vehicle speed (car speed) of the hybrid vehicle. The engine rotation number detecting means 41 detects the engine rotation speed of the internal combustion engine 2. The battery charge state detecting means 42 detects the charge state SOC of the battery 20.

In addition, the drive control unit 38 includes: a target driving force setting means 43; a target driving power setting means 44; a target charge/discharge power setting means 45; a target engine power calculating means 46; a target engine operating point setting means 47; and a motor torque instruction value calculating means 48.

Figure 2:
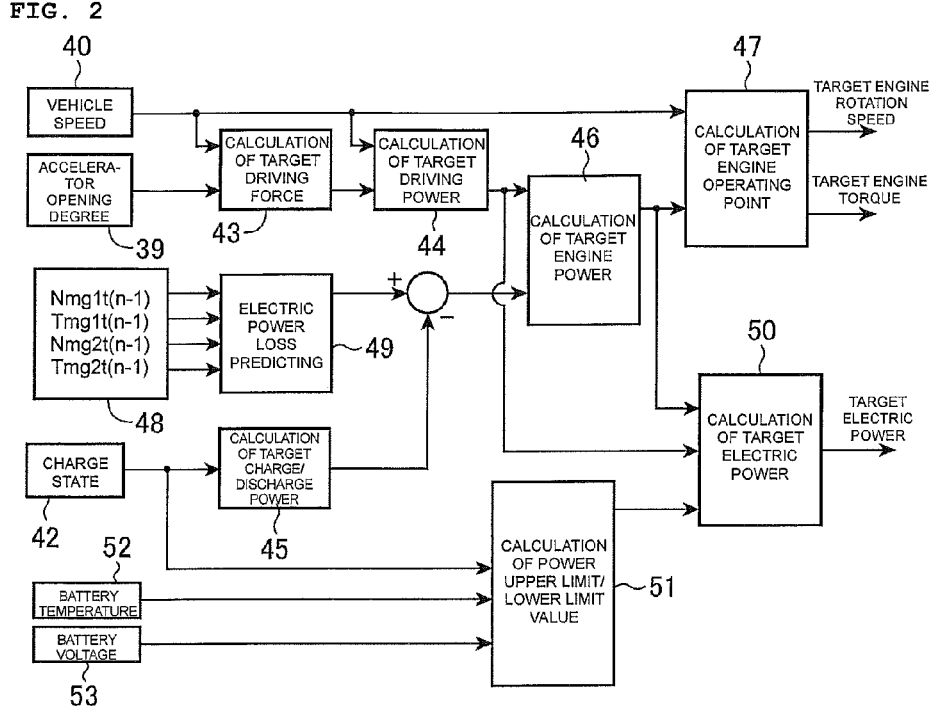
FIG. 2 is a control block diagram of calculating a target engine operating point and target electric power.
Figure 6:
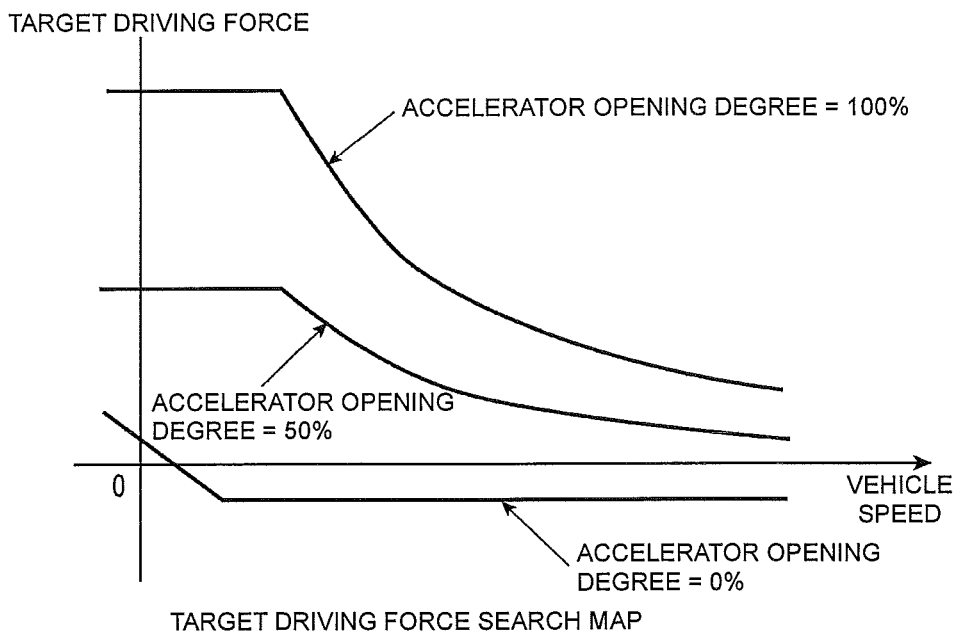
FIG. 6 is a target driving force search map according to a vehicle speed and the accelerator opening degree.

The target driving force setting means 43, as illustrated in FIG. 2, searches a target driving force search map illustrated in FIG. 6 for the target driving force used for driving the hybrid vehicle based on the accelerator opening degree detected by the accelerator opening degree detecting means 39 and the vehicle speed detected by the vehicle speed detecting means 40 and determines the target driving force. The target driving force is set to a negative value so as to be a driving force in a deceleration direction corresponding to engine brake in a high vehicle speed region at the accelerator opening degree=0 and is set to a positive value for creep driving in a low vehicle speed region.

The target driving power setting means 44 sets target driving power based on the accelerator opening degree detected by the accelerator opening degree detecting means 39 and the vehicle speed detected by the vehicle speed detecting means 40. In this embodiment, target driving power is set based on the vehicle speed detected by the vehicle speed detecting means 40 and the target driving force set by the target driving force setting means 43.

The target charge/discharge power setting means 45 sets a target charge/discharge power based on at least the charge state SOC of the battery 20 that is detected by the battery charge state detecting means 42. In this embodiment, the target charging/discharging power is searched from a target charging/discharging power search table illustrated in FIG. 7 in accordance with the charge state SOC of the battery 20 and the vehicle speed and is set. The target charging/discharging power is set such that the absolute value thereof decreases as the vehicle speed is lowered.

The target engine power calculating means 46 calculates the target engine power based on the target driving power set by the target driving power setting means 44 and the target charging/discharging power set by the target charging/discharging power setting means 45.

The target engine operating point setting means 47 sets a target engine operating point (a target engine rotation speed and target engine torque) based on the target engine power and the efficiency of the whole system of the drive control device 1. In this embodiment, the target engine operating point is searched from a target engine operating point search map illustrated in FIG. 8 in consideration of the vehicle speed.

The motor torque instruction value calculating means 48 calculates the target rotation speeds of the first and second motor generators 4 and 5 and sets the torque instruction values thereof.

In addition, the drive control unit 38 includes an electric power loss predicting means 49, a target electric power setting means 50, and a power upper limit/lower limit value calculating means 51. Furthermore, a temperature detecting means 52 detecting the temperature of the battery 20 and a voltage detecting means 53 detecting the voltage of the battery 20 are connected to the drive control unit 38.

The electric power loss predicting means 49, as illustrated in FIG. 2, receives the previous value Nmg1t(n−1) of the target rotation speed and the previous value Tmg1t(n−1) of the torque instruction value of the first motor generator 4 and the previous value Nmg2t(n−1) of the target rotation speed and the previous value Tmg2t(n−1) of the torque instruction value of the second motor generator 5 and calculates the estimated power that is the electric power loss of the first and second motor generators 4 and 5.

The electric power loss predicting means 49, for example, searches the electric power loss search map for the estimated power as an electric power loss. The estimated power as the electric power loss increases as the target driving force increases, and the increasing rate increases as the target driving force increases. In addition, the estimated power as the electric power loss increases as the vehicle speed increases, and the target driving force that is a maximum value thereof decreases as the vehicle speed increases.

In addition, the electric power loss predicting means 49 calculates the estimated power that is the electric power loss of the first motor generator 4 using a quadratic polynomial having the target rotation speed (previous value) and the torque instruction value (previous value) of the first motor generator 4 as variables and calculates the estimated power that is the electric power loss of the second motor generator 5 using a quadratic polynomial having the target rotation speed (previous value) and the torque instruction value (previous value) of the second motor generator 5 as variables.

The target engine power calculating means 46 calculates the target engine power based on the target driving power, the target charge/discharge power, and the estimated power that is the electric power loss.

The target electric power setting means 50 sets a target electric power that is a target value of the input/output electric power of the battery 20 based on a difference between the target engine power calculated by the target engine power calculating means 46 and the target driving power set by the target driving power setting means 44.

The motor torque instruction value calculating means 48 calculates torque instruction values of the first and second motor generators 4 and 5 by using the torque balance equation including the target engine torque acquired at the target engine operating point and the electric power balance equation including the target electric power set by the target electric power setting means 50. In this electric power balance equation, the electric power that is generated or consumed by the first and second motor generators 4 and 5, the estimated power that is the electric power loss in the first and second motor generators 4 and 5, and the input/output electric power of the battery 20 are included.

The power upper limit/lower limit value calculating means 51 sets an upper limit value and a lower limit value of the electric power limiting the input/output electric power of the battery based on the state parameters of the battery 20. The power upper limit/lower limit value calculating means 51, as illustrated in FIG. 2, sets the temperature detected by the temperature detecting means 52, the voltage detected by the voltage detecting means 53, and the charge state detected by the battery charge state detecting means 42 as the state parameters of the battery 20 and determines the upper limit value and the lower limit value of the electric power by subtracting the estimated power from the retrieved value acquired from the search table (FIGS. 17 to 19) based on the temperature, the voltage, and the charge state as the state parameters of the battery 20.

The target electric power calculating means 51 calculates the target electric power based on a difference between the target engine power calculated by the target engine power calculating means 46 and the target driving power and, when the target electric power comes off a range set by the upper limit value and the lower limit value of the electric power, limits the target electric power to the upper limit value of the electric power or the lower limit value of the electric power.

Figure 3:
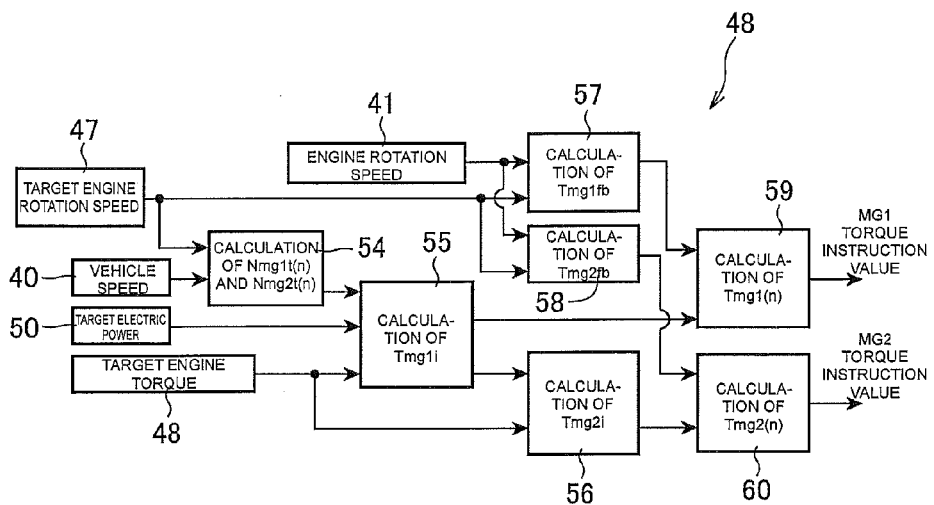
FIG. 3 is a control block diagram of calculating a torque instruction value of a motor generator.

The torque instruction value of the first motor generator 4 and the torque instruction value of the second motor generator 5 set by the motor torque instruction value calculating means 48, as illustrated in FIG. 3, are calculated by first to seventh calculation units 54 to 60. In FIG. 3, MG1 represents the first motor generator 4, and MG2 represents the second motor generator 5.

The first calculation unit 54 calculates a target rotation speed Nmg1t(n) of the first motor generator 4 and a target rotation speed Nmg2t(n) of the second motor generator 5 in a case where the engine rotation speed is the target engine rotation speed based on the target engine rotation speed set by the target engine operating point setting means 47 and the vehicle speed detected by the vehicle speed detecting means 40.

The second calculation unit 55 calculates the basic torque Tmg1i of the first motor generator 4 based on the target rotation speed Nmg1t(n) of the first motor generator 4 and the target rotation speed Nmg2t(n) of the second motor generator 5, which are calculated by the first calculation unit 54, the target electric power set by the target electric power setting means 50, and the target engine torque set by the target engine operating point setting means 47.

The third calculation unit 56 calculates the basic torque Tmg2i of the second motor generator 5 based on the basic torque Tmg1i of the first motor generator 4 that is calculated by the second calculation unit 55 and the target engine torque set by the target engine operating point setting means 47.

The fourth calculation unit 57 calculates the feedback correction torque Tmg1fb of the first motor generator 4 based on the engine rotation speed detected by the engine rotation speed detecting means 41 and the target engine rotation speed set by the target engine operating point setting means 47.

The fifth calculation unit 58 calculates feedback correction torque Tmg2fb of the second motor generator 5 based on the engine rotation speed detected by the engine rotation speed detecting means 41 and the target engine rotation speed set by the target engine operating point setting means 47.

The sixth calculation unit 59 calculates a torque instruction value Tmg1(n) of the first motor generator 4 based on the basic torque Tmg1i of the first motor generator 4 that is calculated by the second calculation unit 55 and the feedback correction torque Tmg1fb of the first motor generator 4 that is calculated by the fourth calculation unit 57.

The seventh calculation unit 60 calculates a torque instruction value Tmg2(n) of the second motor generator 5 based on the basic torque Tmg2i of the second motor generator 5 that is calculated by the third calculation unit 56 and the feedback correction torque Tmg2fb of the second motor generator 5 that is calculated by the fifth calculation unit 58.

The drive control device 1 of the hybrid vehicle performs control of the drive states of the air content adjusting means 9, the fuel supplying means 10, and the ignition means 11 such that the internal combustion engine 2 operates at the target engine operating point (the target engine rotation speed and the target engine torque) set by the target engine operating point setting means 47 by using the drive control unit 38. In addition, the drive control unit 38 performs control of the drive states of the first and second motor generators 4 and 5 using the torque instruction values set by the motor torque instruction value calculating means 48 such that the charge state (SOC) of the battery 20 is the target electric power set by the target electric power setting means 50.

Figure 4:
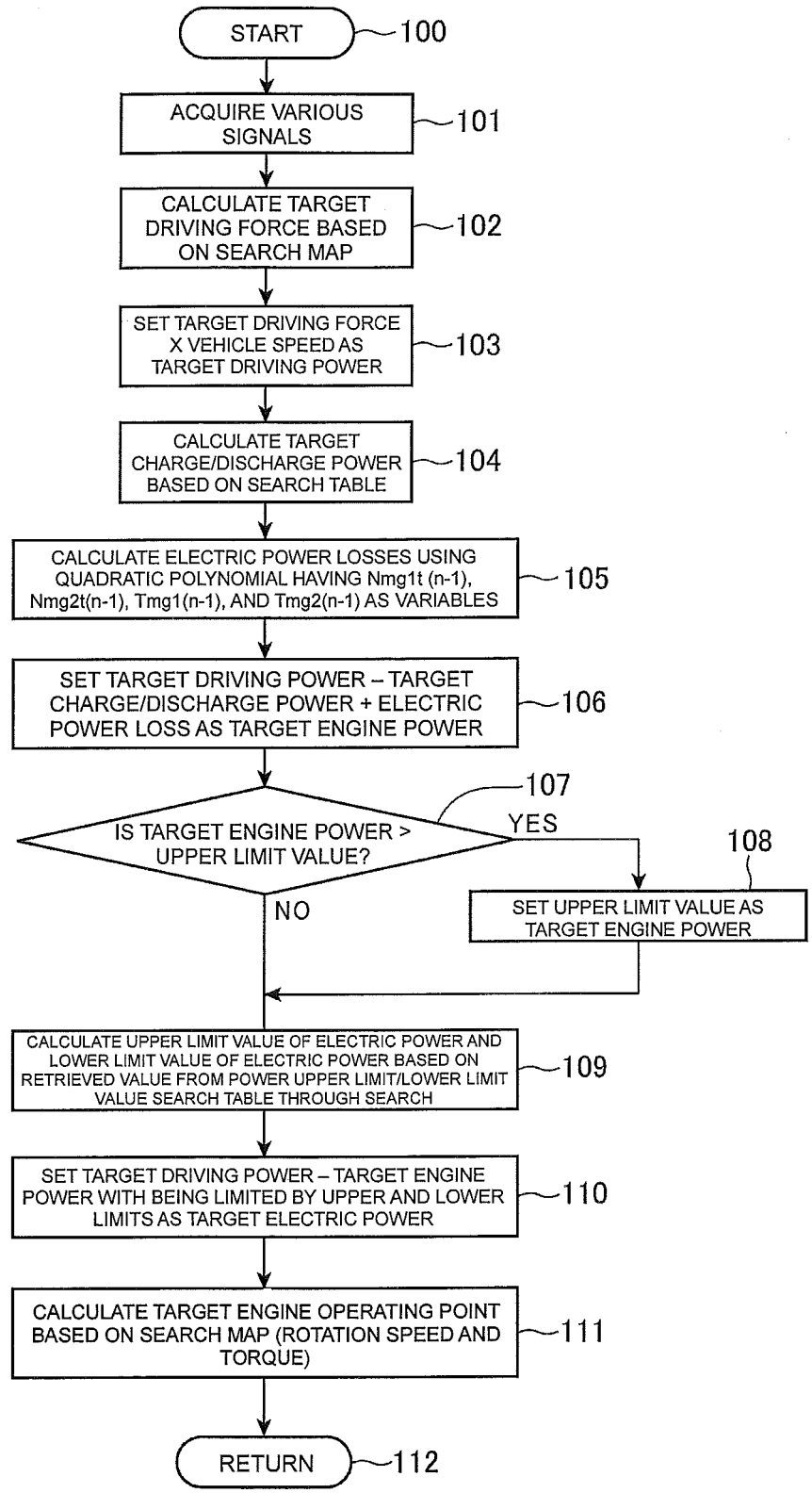
FIG. 4 is a control flowchart of calculating a target engine operating point.
Figure 5:
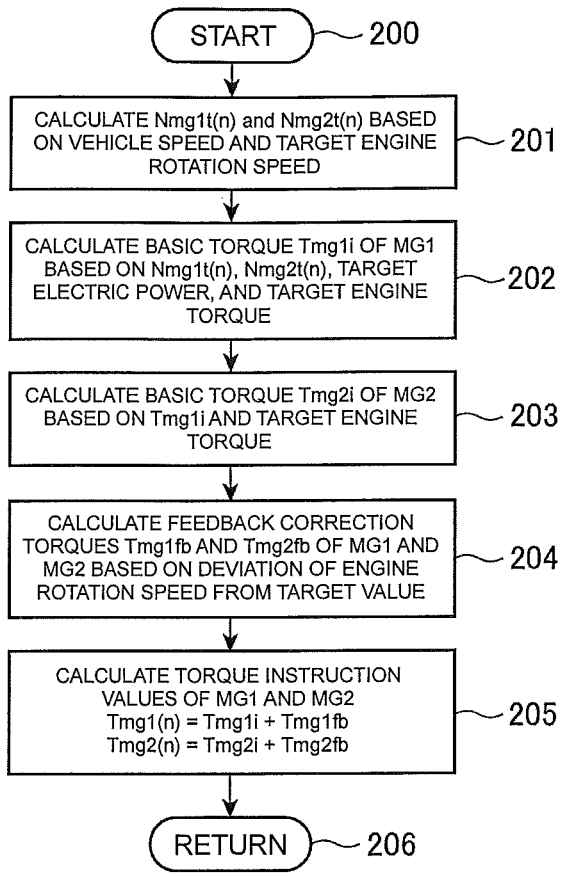
FIG. 5 is a control flowchart of calculating a torque instruction value of a motor generator.

The drive control device 1 of the hybrid vehicle, as illustrated in the flowchart of controlling the calculation of the target engine operating point represented in FIG. 4, calculates a target engine operating point (the target engine rotation speed and the target engine torque) based on the amount of driver's operation of the accelerator (accelerator opening degree) and the vehicle speed and, as illustrated in the flowchart of controlling the calculation of the motor torque instruction value represented in FIG. 5, calculates the torque instruction values of the first and second motor generators 4 and 5 based on the target engine operating point.

In the calculation of the target engine operating point, as illustrated in FIG. 4, when the control program starts (100), in Step 101, various signals of the accelerator opening degree detected by the accelerator opening degree detecting means 39, the vehicle speed detected by the vehicle speed detecting means 40, the engine rotation speed detected by the engine rotation speed detecting means 41, the charge state SOC of the battery 20 detected by the battery charge state detecting means 42, the temperature detected by the temperature detecting means 52, and the voltage detected by the voltage detecting means 53 are acquired.

In Step 102, the target driving force according to the vehicle speed and the accelerator opening degree is calculated using the target driving force detection map (see FIG. 6). The target driving force is set to a negative value so as to be a driving force in a deceleration direction corresponding to engine braking in a high vehicle speed region at the accelerator opening degree=0 and is set to a positive value for slow driving in a low vehicle speed region.

In Step 103, the target driving power required for driving the hybrid vehicle with the target driving force is calculated by multiplying the target driving force calculated in Step 102 by the vehicle speed.

Figure 7:
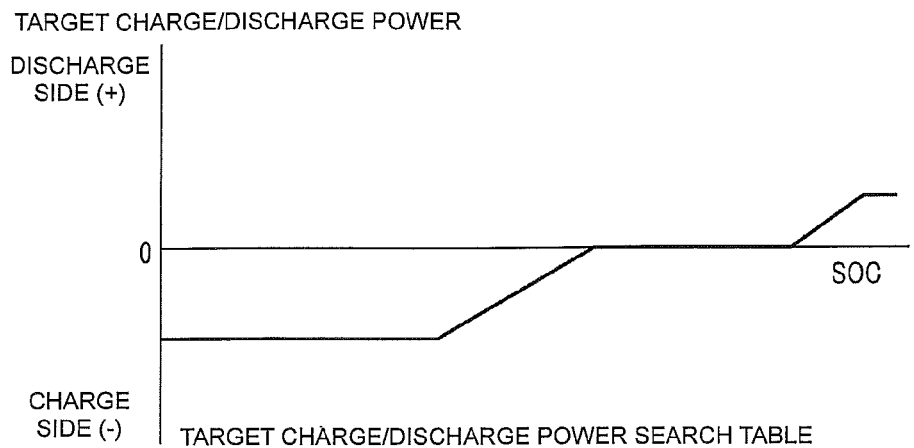
FIG. 7 is a target charging/discharging power search table according to the charge state of a battery.

In Step 104, in order to control the charge state SOC of the battery 20 in a normal use range, a target charge/discharge amount is calculated based on the target charge/discharge power search table illustrated in FIG. 7. In a case where the charge state SOC of the battery 20 is low, the target charging/discharging power is increased on the charge side so as to prevent excessive discharge of the battery 20. In a case where the charge state SOC of the battery 20 is high, the target charging/discharging power is increased on the discharge side so as to prevent an excessive charge. The target charge/discharge power, for the convenience of description, the discharge side is set as a positive value and the charge side is set as a negative value.

In Step 105, the electric power losses of the first and second motor generators 4 and 5 are calculated by using an equation approximating a quadratic polynomial having the previous calculation value Nmg1t(n−1) of the target rotation speed and the previous calculation value Tmg1(n−1) of the target torque of the first motor generator 4 and the previous calculation value Nmg2t(n−1) of the target rotation speed and the previous calculation value Tmg2(n−1) of the target torque of the second motor generator 5 and a sum thereof is used as the electric power loss in the subsequent calculations. At this time point, it is before the determination of the operating points of the first and second motor generators 4 and 5, the calculation is performed using the values calculated at the previous time.

The approximated equation of the loss (here, $a_1, b_1, \ldots, i_1$ are constants) in the first motor generator 4 is as follows.

$$Ploss_1 = a_1(Tmg1)^2(Nmg1)^2 + b_1(Tmg1)^2(Nmg1) + c_1(Tmg1)^2 + d_1(Tmg1)(Nmg1)^2 + e_1(Tmg1)(Nmg1) + f_1(Tmg1) + g_1(Nmg1)^2 + h_1(Nmg1) + i_1$$

The approximated equation of the loss (here, $a_2, b_2, \ldots, i_2$ are constants) in the second motor generator 5 is as follows.

$$Ploss_2 = a_2(Tmg2)^2(Nmg2)^2 + b_2(Tmg2)^2(Nmg2) + c_2(Tmg2)^2 + d_2(Tmg2)(Nmg2)^2 + e_2(Tmg2)(Nmg2) + f_2(Tmg2) + g_2(Nmg2)^2 + h_2(Nmg2) + i_2$$

In Step 106, the power (target engine power) to be output by the internal combustion engine 2 is calculated based on the target driving power, the target charging/discharging power, and the electric power loss. The power to be output by the internal combustion engine 2 has a value acquired by adding (subtracting in the case of discharge) the power for charging the battery 20 to the power required for driving the hybrid vehicle. Here, since the charge side is handled as a negative value, the target engine power is calculated by subtracting the target charging/discharging power from the target driving power and adding the electric power loss thereto.

In Step 107, it is determined whether the calculated target engine power exceeds an upper limit. In the case of "Yes" in the determination (107), the target engine power is replaced by the upper limit value (108), and the process proceeds to Step 109. In the case of "No" in the determination (107), the process proceeds to Step 109. In Steps 107 and 108, restriction according to the upper limit value of the target engine power is performed. The upper limit value is a maximum value of the output that can be output by the internal combustion engine 2.

Figure 17:
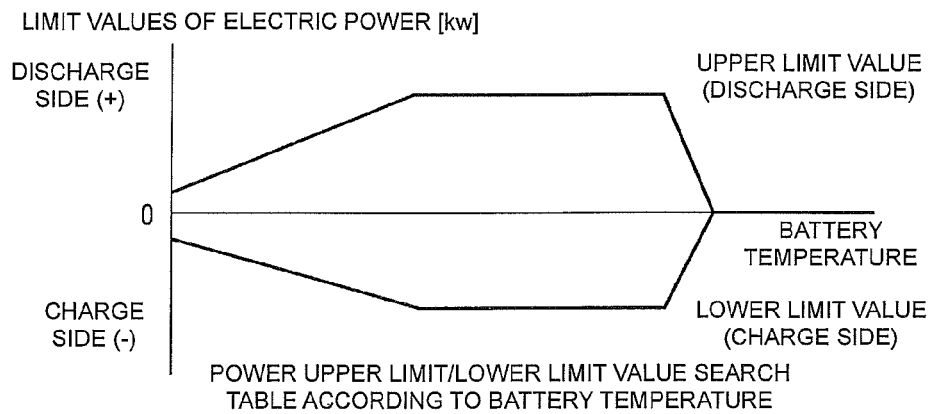
FIG. 17 is a diagram that illustrates a power upper limit/lower limit value search table according to the temperature of the battery.
Figure 18:
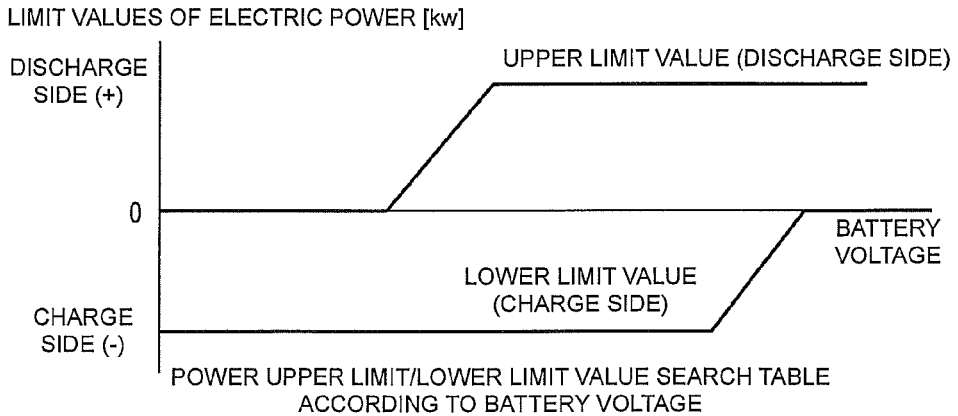
FIG. 18 is a diagram that illustrates a power upper limit/lower limit value search table according to the voltage of the battery.
Figure 19:
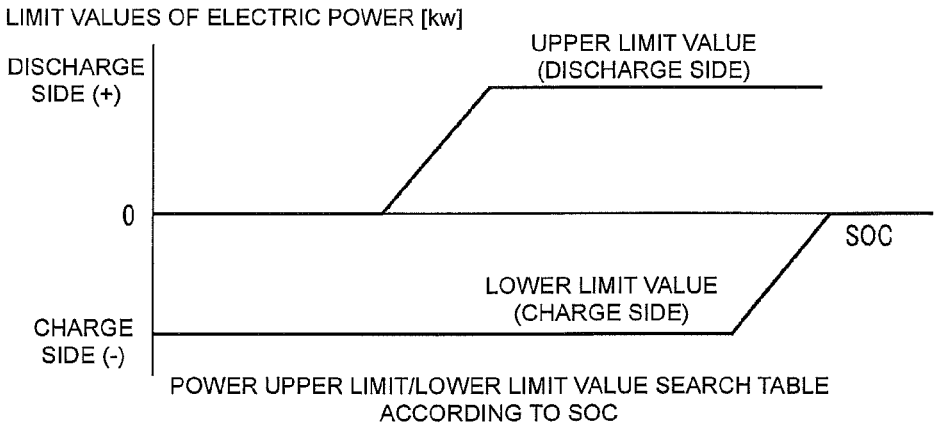
FIG. 19 is a diagram that illustrates a power upper limit/lower limit value search table according to the charge state of the battery.

In Step 109, an upper limit value and a lower limit value of the electric power are calculated based on each power upper limit/lower limit value search table according to the temperature, the voltage, and the charge state of the battery 20 illustrated in FIGS. 17, 18, and 19. Since the discharge side is regarded as a positive value, and the charge side is regarded as a negative value, among values calculated in each power upper limit/lower limit value search table, a minimum value of the discharge side calculated as the upper limit value of the electric power, and a value of the charge side of which the absolute value is a minimum is calculated as the lower limit value of the electric power.

FIG. 17 illustrates an example of limiting using the temperature of the battery 20. When the temperature is low, the reaction rate of the battery 20 decreases, and electric power that can be charged or discharged decreases. On the other hand, in a case where the temperature of the battery 20 is high, it is necessary to limit the charging/discharging electric power so as to prevent an increase in the temperature.

FIG. 18 illustrates an example of limiting using the voltage of the battery 20. In a battery 20, there are an upper limit value voltage and a lower limit value voltage for the protection thereof, and when the battery is used over the range, the battery 20 is degraded. Accordingly, it is necessary to limit charging in a case where the voltage is high, and it is necessary to limit discharging in a case where the voltage is low.

FIG. 19 illustrates an example of limiting using the charge state SOC of the battery 20. The charge state SOC of the battery 20 needs to be prevented from overdischarge or overcharge. Thus, when the charge state SOC is low, discharging needs to be limited, and, when the charged state SOC is high, charging needs to be limited. In addition, in the target charging/discharging power search table illustrated in FIG. 7, in order to prevent overcharging, when the charge state SOC is high, the charge power is set to be low, and this value is for setting the power generation power using the power of the internal combustion engine 2 and charging according to the regenerative power generation on a downward slope is limited by the limit value of the charge side illustrated in FIG. 19.

In a case where the driving force requested from the driver needs power assistance according to the battery 20, power assistance is performed as described later and, in such a case, the charge state SOC is lowered in accordance with the consumed power. When the power assistance is frequently performed, the power assistance is performed again before the charge state SOC is recovered and, accordingly, the charge state SOC is gradually lowered. In such a case, the discharge side is limited.

In Step 110, the target power is calculated by subtracting the target engine power from the target driving power and limiting the target power by an electric power upper limit/lower limit value. In a case where the target driving power is higher than the target engine power, the target electric power has a value representing the assistance power according to the electric power of the battery 20. In addition, in a case where the target engine power is higher than the target driving power, the target electric power has a value representing the charging electric power for the battery 20.

Figure 8:
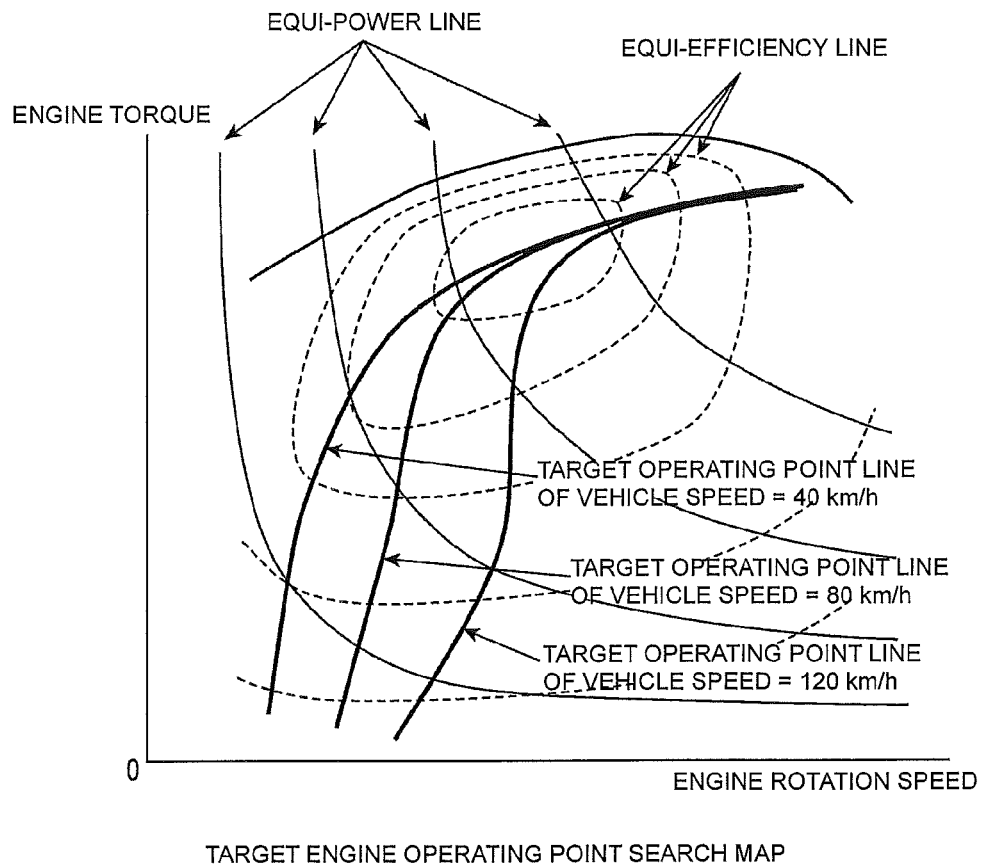
FIG. 8 is a target engine operating point search map according to engine torque and an engine rotation speed.

In Step 111, a target engine operating point according to the target engine power and the vehicle speed is calculated based on the target engine operating point search map illustrated in FIG. 8, and the process is returned (112).

The target engine operating point search map (FIG. 8) selects points at which the total efficiency acquired by adding the efficiency of the power transmission system configured by the differential gear mechanism 8 and the first and second motor generators 4 and 5 to the efficiency of the internal combustion engine 2 is high on the equi-power line for each power level and sets a line acquired by joining the points as a target engine operating point line. Each target engine operating point line is set for each vehicle speed (40 km/h, 80 km/h, and 120 km/h in FIG. 8). The set value of the target engine operating point line may be acquired through an experiment or may be acquired through a calculation that is based on the efficiency of the internal combustion engine 2 and the first and second motor generators 4 and 5. In addition, the target engine operating point line is set to move to the high rotation side as the vehicle speed increases.

The reason for this is as follows.

Figure 9:
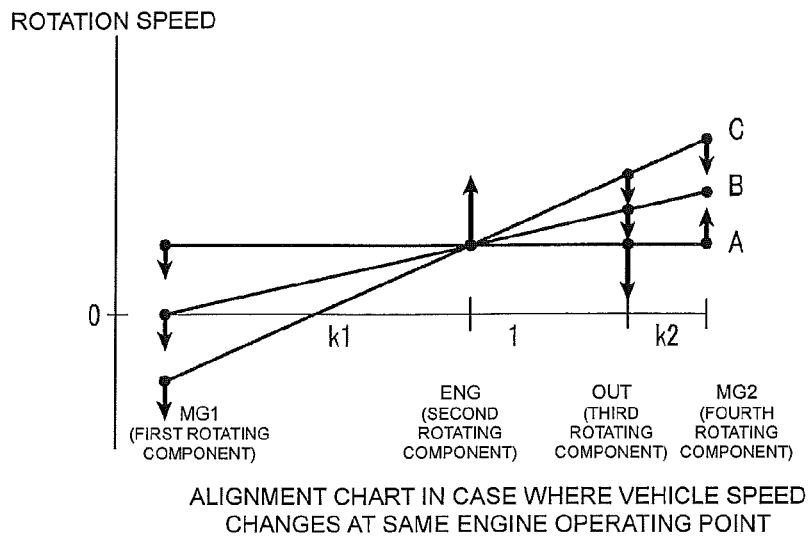
FIG. 9 is an alignment chart in a case where the vehicle speed is changed at the same engine operating point.

In a case where the same engine operating point is set as the target engine operating point regardless of the vehicle speed, as illustrated in FIG. 9, the rotation speed of the first motor generator 4 is positive in a case where the vehicle speed is low, and the first motor generator 4 serves as a power generator, and the second motor generator 5 serves as an electric motor (A). Then, as the vehicle speed increases, the rotation speed of the first motor generator 4 approaches zero (B) and, when the vehicle speed further increases, the rotation speed of the first motor generator 4 becomes negative. In this state, the first motor generator 4 operates as an electric motor and the second motor generator 5 operates as a power generator (C).

In a case where the vehicle speed is low (states A and B), since the circulation of the power does not occur, and the target engine operating point, like the target engine operating point line of the vehicle speed=40 km/h illustrated in FIG. 8, is close to a point at which the efficiency of the internal combustion engine 2 is high on the whole.

However, in a case where the vehicle speed is high (state C), the first motor generator 4 operates as an electric motor, the second motor generator 5 operates as a power generator, and accordingly, the circulation of the power occurs, whereby the efficiency of the power transmission system is lowered. Accordingly, as illustrated at a point C illustrated in FIG. 11, the efficiency of the power transmission system is lowered even when the efficiency of the internal combustion engine 2 is high, and accordingly, the total efficiency is lowered.

Figure 11:
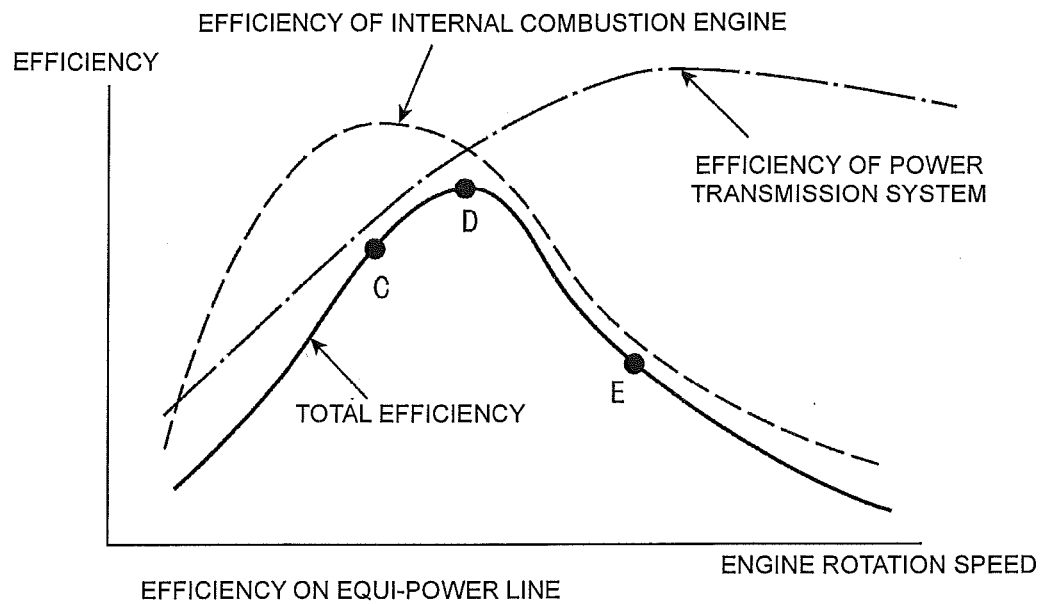
FIG. 11 is a diagram that illustrates the efficiency on an equi-power line formed by efficiency and a rotation speed.
Figure 12:
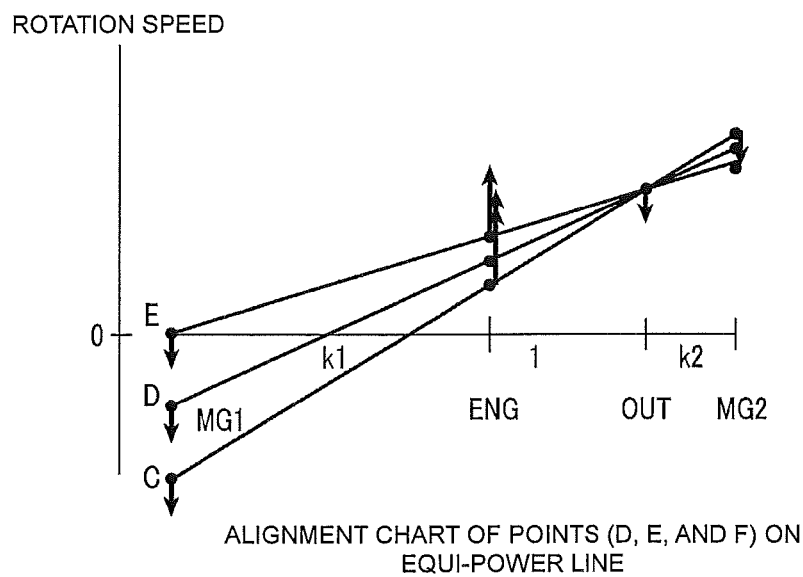
FIG. 12 is an alignment chart of points (D, E, and F) on an equi-power line.

Thus, in order not to cause the circulation of power to occur in the high vehicle speed region, like E in the alignment chart illustrated in FIG. 12, the rotation speed of the first motor generator 4 may be set to zero or higher. However, in such a case, the engine operating point of the internal combustion engine 2 moves in a direction in which the engine rotation speed of the internal combustion engine 2 increases. Thus, as illustrated in point E illustrated in FIG. 11, even when the efficiency of the power transmission system is high, the efficiency of the internal combustion engine 2 is lowered, whereby the total efficiency is lowered.

Accordingly, as illustrated in FIG. 11, a point at which the total efficiency is high is D therebetween and, by setting this point as the target engine operating point, an operation having the highest efficiency can be performed.

Figure 10:
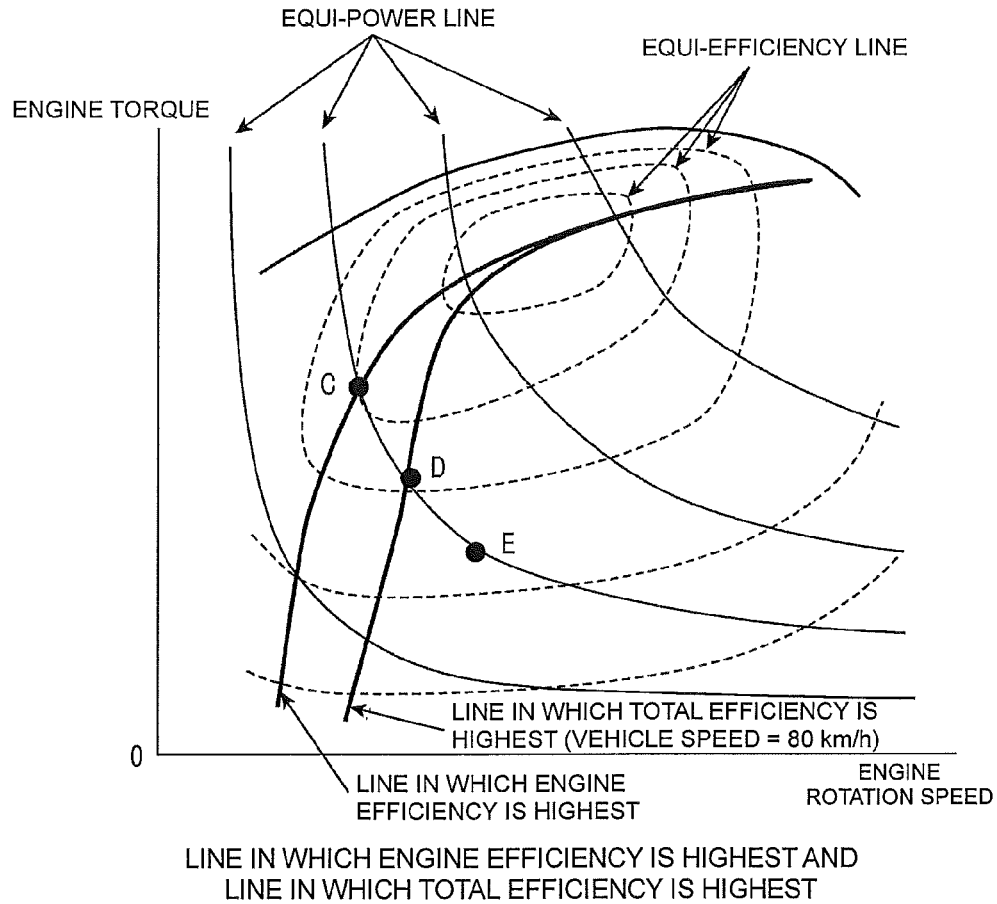
FIG. 10 is a diagram that illustrates a line of the highest engine efficiency and a line of the highest total efficiency in a target engine operating point search map formed by engine torque and an engine rotation speed.

As above, in FIG. 10, three engine operating points C, D, and E are represented on the target engine operating point search map. It can be understood that an operating point at which the total efficiency is the highest moves to a further high rotation side than an operating point at which the engine efficiency is the highest in a case where the vehicle speed is high.

Next, the calculation of torque instruction values that are the target torque of the first motor generator 4 and the target torque of the second motor generator 5 used for setting the amount of charging/discharging of the battery 20 as a target value while the target driving force is output will be described along the flowchart of controlling the calculation of the motor torque instruction values illustrated in FIG. 5. In FIG. 5, MG1 represents the first motor generator 4, and MG2 represents the second motor generator 5.

In the calculation of the motor torque instruction values, as illustrated in FIG. 5, when a control program starts (200), first, in Step 201, the driving shaft rotation speed No of the driving shaft 7 to which the first and second planetary gear mechanisms 21 and 22 are connected is calculated based on the vehicle speed. Next, the target rotation speed Nmg1t of the first motor generator 4 and the target rotation speed Nmg2t of the second motor generator 5 in a case where the engine rotation speed Ne is the target engine rotation speed Net are calculated by using the following Equations (1) and (2).

These Equations (1) and (2) for the calculation are acquired based on the relation between the rotation speeds of the first and second planetary gear mechanisms 21 and 22.

$$Nmg1t(n)=(Net-No)*k1+Net \qquad \text{Equation (1)}$$

$$Nmg2t(n)=(No-Net)*k2+No \qquad \text{Equation (2)}$$

Here, k1 and k2, as will be described later, are values that are determined based on the gear ratio between the first and second planetary gear mechanisms 21 and 22.

Next, in Step 202, the basic torque Tmg1i of the first motor generator 4 is calculated by using the following Equation (3) based on the target rotation speed Nmg1t(n) of the first motor generator 4 and the target rotation speed Nmg2t(n) of the second motor generator 5, which have been acquired in Step 201, the target charge/discharge power Patt, and the target engine torque Tet.

$$\begin{aligned}Tmg1i=&(-(B_1+A_2(2Tet(1+k1)/k2^2)+B_2(1+k1)/k2+\\&Nmg1*2\pi/60+Nmg2*2\pi/60*(1+k1)/k2)+((B_1+\\&A_2*2Tet(1+k1)/k2^2+B_2(1+k1)/k2+Nmg1*2\pi/60+\\&Nmg2*2\pi/60*(1+k1)/k2)^2-4(A_1+A_2(1+k1)^2/k2^2)\\&(C_1+C_2+A_2Tet^2/k2^2+B_2Tet/k2+Nmg2*2\pi/60*Tet/\\&k2-Pbatt))^{1/2})/2(A_1+A_2(1+k1)^2/k2^2) \qquad \text{Equation (3)}\end{aligned}$$

Here, $A_1=a_1Nmg1^2+b_1Nmg1+c_1$, $B_1=d_1Nmg1^2+e_1Nmg1+f_1$, and $C_1=g_1Nmg1^2+h_1Nmg1+i_1$.

In addition, $A_2=a_2Nmg1^2+b_2Nmg1+c_2$, $B_2=d_2Nmg1^2+e_2Nmg1+f_2$, and $C_2=g_2Nmg1^2+h_2Nmg1+i_2$ (here, $a_1, b_1 \ldots i_1$, and $a_2, b_2 \ldots i_2$ are constants used in the approximated equation of the electric power loss)

This Equation (3) for the calculation can be derived by solving certain simultaneous equations from a torque balance equation (4) representing the balance of torques input to the first and second planetary gear mechanisms 21 and 22 and an electric power balance equation (5) representing that the electric power (including losses) generated or consumed by the first and second motor generators 4 and 5 and the input/output electric power (Pbatt) for the battery 20 are the same.

$$Te+(1+k1)*Tmg1=k2*Tmg2 \qquad \text{Equation (4)}$$

$$Nmg1*Tmg1*2\pi/60+Nmg2*Tmg2*2\pi/60+Ploss_1+Ploss_2=Pbatt \qquad \text{Equation (5)}$$

Next, in Step 203, the basic torque Tmg2i of the second motor generator 5 is calculated by using the following Equation (6) based on the basic torque Tmg1i of the first motor generator 4 and the target engine torque.

$$Tmg2i=(Te+(1+k1)*Tmg1i)/k2 \qquad \text{Equation (6)}$$

This equation is derived from Equation (4) described above.

Next, in Step 204, in order to make the engine rotation speed approach the target, the feedback correction torque Tmg1fb of the first motor generator 4 and the feedback correction torque Tmg2fb of the second motor generator 5 are calculated by multiplying the deviation of the engine rotation speed Ne from the target engine rotation speed Net by a predetermined feedback gain set in advance.

In Step 205, a torque instruction value Tmg1(n) that is a control instruction value acquired by adding the feedback correction torque Tmg1fb of the first motor generator 4 to the basic torque Tmg1i is calculated, a torque instruction value Tmg2(n) that is a control instruction value acquired by adding the feedback correction torque Tmg2fb of the second motor generator 5 to the basic torque Tmg2i is calculated, and the process is returned (206).

The drive control unit 38 controls the first and second motor generators 4 and 5 in accordance with the torque instruction values Tmg1(n) and Tmg2(n), whereby the amount of charging/discharging for the battery 20 can be the target value while the target driving force is output.

FIGS. 13 to 16 illustrate alignment charts in representative operation states.

Here, values k1 and k2 determined based on the gear ratio of the differential gear mechanism 8 formed by the first and second planetary gear mechanisms 21 and 22 are defined as below.

$$k1=ZR1/ZS1$$

$$k2=ZS2/ZR2$$

ZS1: the number of teeth of first sun gear
ZR1: the number of teeth of first ring gear
ZS2: the number of teeth of second sun gear
ZR2: the number of teeth of second ring gear Next, the operation states will be described using an alignment chart. In the rotation speed, the rotation direction of the output shaft 3 of the internal combustion engine 2 is set as a positive direction. In addition, in the torque that is input/output to/from each shaft, a direction in which the torque having the same direction as that of the torque of the output shaft 3 of the internal combustion engine 2 is input is defined as positive. Accordingly, in a case where the torque of the driving shaft 7 is positive, a state is formed in which the torque for driving the hybrid vehicle to the rear side is output (deceleration at the time of forward driving and driving at the time of backward driving). On the other hand, in a case where the torque of the driving shaft 7 is negative, a state is formed in which the torque for driving the hybrid vehicle to the front side is output (driving at the time of forward driving, and deceleration at the time of backward driving).

In a case where the power generation or backward driving (acceleration by transmitting power to the drive shaft 7 or maintaining a balanced speed on an ascending slope) is performed by the first and second motor generators 4 and 5, there are losses due to heat generation in the first and second inverters 18 and 19 and the first and second motor generators 4 and 5 and, accordingly, the efficiency is not 100% in a case where a conversion between electric energy and mechanical energy is made. However, for the simplification of description, it is assumed that there is no loss. In a case where the loss is considered for practical implementation, the power generation is controlled so as to additionally generate power corresponding to the energy consumed due to the loss.

Figure 13:
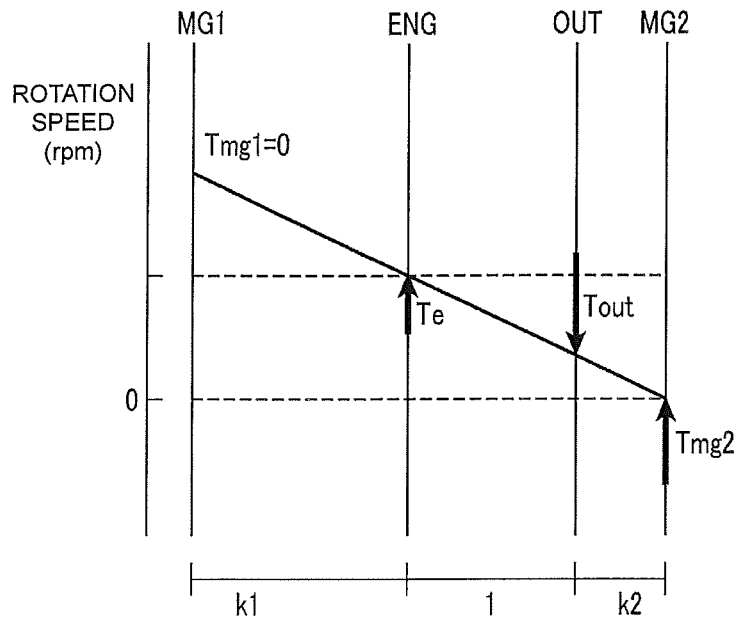
FIG. 13 is an alignment chart of the state of a low gear ratio.

(1) Low Gear Ratio State (FIG. 13)

Driving is performed using the internal combustion engine 2, and a state is formed in which the rotation speed of the second motor generator 5 is zero. The alignment chart at this time is illustrated in FIG. 13. Since the rotation speed of the second motor generator 5 is zero, no power is consumed. Thus, in a case where there is no charging/discharging of the battery 20, the power generation using the first motor generator 4 does not need to be performed, and the torque instruction value Tmg1 of the first motor generator 4 is zero.

In addition, the ratio between the engine rotation speed of the output shaft 3 and the driving shaft rotation speed of the driving shaft 7 is $(1+k2)/k2$.

Figure 14:
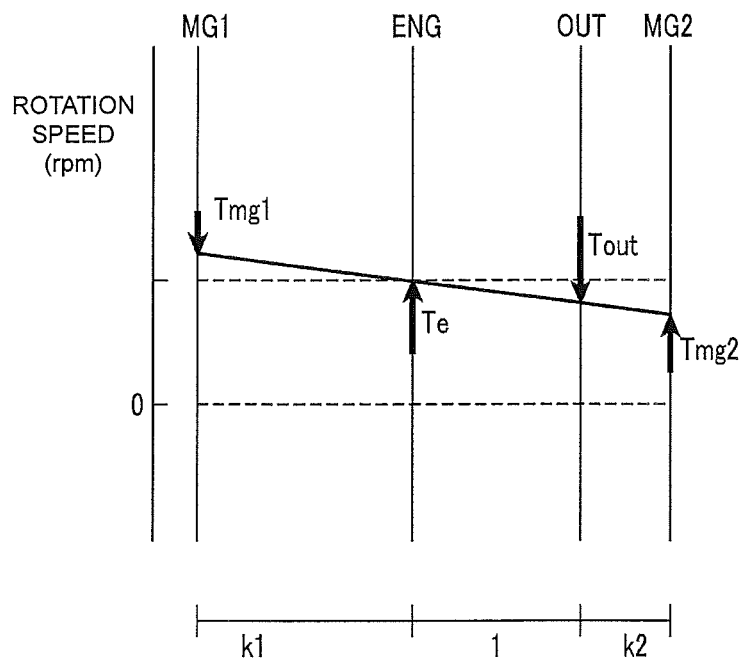
FIG. 14 is an alignment chart of the state of an intermediate gear ratio.

(2) Intermediate Gear Ratio State (FIG. 14)

Driving is performed using the internal combustion engine 2, and a state is formed in which the rotation speeds of the first and second motor generators 4 and 5 are positive. The alignment chart at this time is illustrated in FIG. 14. In this case, in a case where there is no charge/discharge of the battery 20, the first motor generator 4 is regenerated, and the second motor generator 5 is reversely operated using the regenerated electric power.

Figure 15:
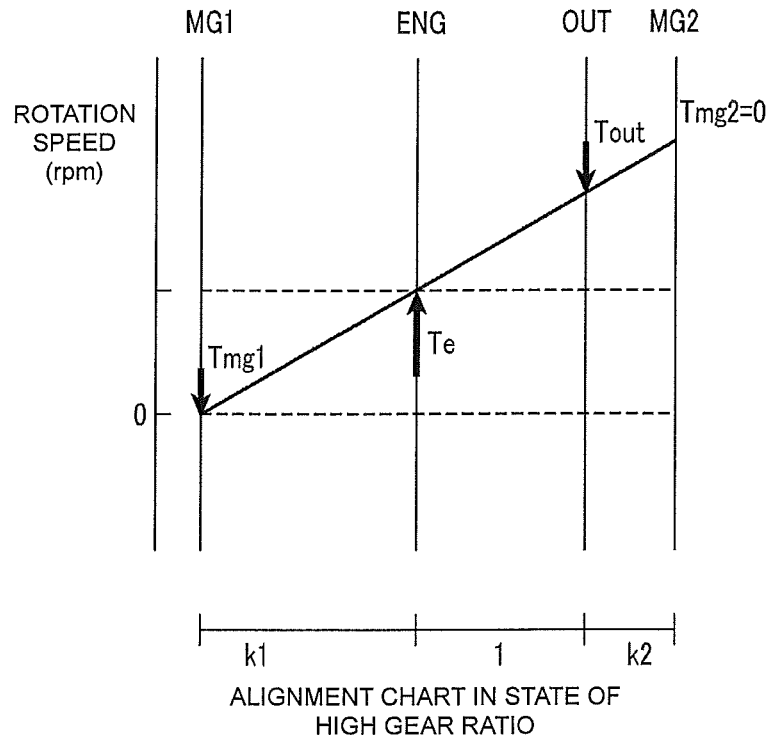
FIG. 15 is an alignment chart of the state of a high gear ratio.

(3) High Gear Ratio State (FIG. 15)

Driving is performed using the internal combustion engine 2, and a state is formed in which the rotation speed of the first motor generator 4 is zero. The alignment chart at this time is illustrated in FIG. 15. Since the rotation speed of the first motor generator 4 is zero, regeneration is not performed. Accordingly, in a case where there is no charging/discharging of the battery 20, the reverse operation or the regeneration is not performed by the second motor generator 5, and the torque instruction value Tmg2 of the second motor generator 5 is zero.

In addition, the ratio between the engine rotation speed of the output shaft 3 and the driving shaft rotation speed of the driving shaft 7 is $k1/(1+k1)$.

Figure 16:
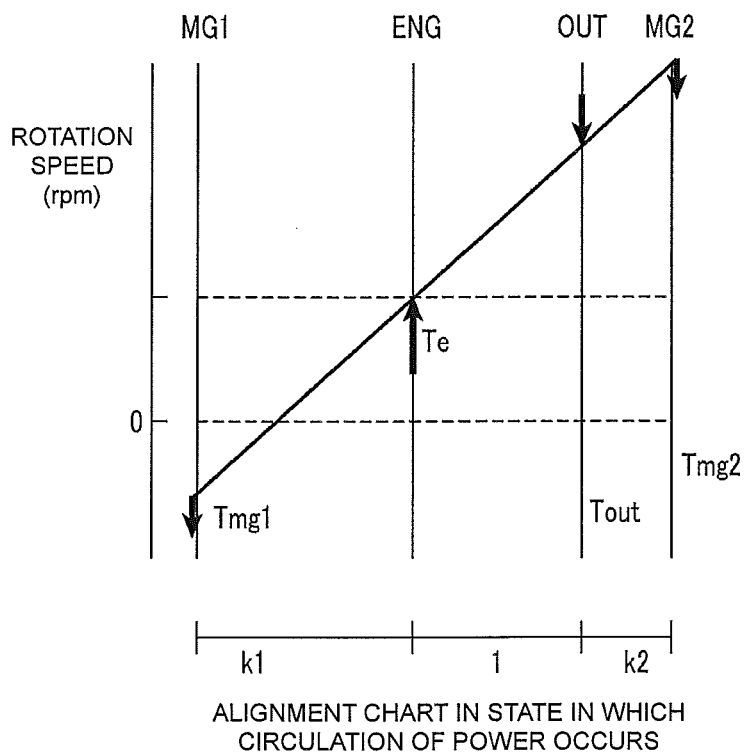
FIG. 16 is an alignment chart of the state in which power circulation occurs.

(4) State in which Power Circulation is Performed (FIG. 16)

In a state in which the vehicle speed is higher than the high gear ratio state, a state is formed in which the first motor generator 4 is reversely rotated. In this state, the first motor generator 4 is reversely operated, thereby consuming the electric power. Accordingly, in a case where there is no charging/discharging of the battery 20, the second motor generator 5 is regenerated and performs power generation.

As above, the drive control device 1 of the hybrid vehicle includes: the target driving power setting means 44 that sets the target driving power based on the accelerator opening degree and the vehicle speed; the target charging/discharging power setting means 45 that sets the target charging/discharging power based on at least the charged state of the battery 20; the target engine power calculating means 46 that calculates the target engine power based on the target driving power and the target charging/discharging power; the target engine operating point setting means 47 that sets a target engine operating point based on the target engine power and the total system efficiency; and the motor torque instruction value calculating means 48 that calculates the target rotation speeds of the first and second motor generators 4 and 5 and sets the torque instruction values of the motor generators.

When feedback correction is performed, the motor torque instruction value calculating means 48 calculates the torque correction value (feedback correction torque) of the first motor generator 4 and a torque correction value (feedback correction torque) of the second motor generator 5 based on a deviation between the actual engine rotation speed and the target engine rotation speed and sets the ratio between the torque correction value of the first motor generator 4 and the torque correction value of the second motor generator 5 so as to be a ratio that is based on the lever ratio of the differential gear mechanism 8 that is a power input/output device.

Accordingly, the drive control device 1 of the hybrid vehicle offsets the change of the torque of the internal combustion engine 2 with the driving shaft 7 as a supporting point by using the torque balance equation that is in consideration of a change in the torque, and accordingly, even when a change of the torque of the internal combustion engine 2 occurs, it does not affect the torque of the driving shaft 7.

The differential gear mechanism 8 as the power input/output device aligns the four rotating components 34 to 37 in order of the first rotating component 34 connected to the first motor generator 4, the second rotating component 35 connected to the internal combustion engine 2, the third rotating component 36 connected to the driving shaft 7, and the fourth rotating component 37 connected to the second motor generator 5 in order in the alignment chart and the mutual lever ratio of such rotating components is arranged as k1:1:k2 in the same order, and the torque correction value of the first motor generator 4 and the torque correction value of the second motor generator 5 are set so as to maintain the relation in which a value acquired by multiplying the torque correction value of the first motor generator 4 by k1 is the same as a value acquired by multiplying the torque correction value of the second motor generator 5 by $(1+k2)$. The torque balance equation can be appropriately used in a case where the differential gear mechanism 8 including four rotating components similar to each other having mutually-different lever ratios is configured.

In addition, the drive control device 1 sets feedback correction amounts set to the torque instruction values of the first and second motor generators 4 and 5 based on the gear ratio or the lever ratio of the differential gear mechanism 8 including four rotating components 34 to 37 connected to a plurality of the first and second motor generators 4 and 5, the driving shaft 7, and the internal combustion engine 2 in association with each other.

In the above-described torque balance equation, as represented in Equation (4) described above, the target torques (torque instruction values) of the first and second motor generators 4 and 5 and the target engine torque of the internal combustion engine 2 are balanced based on the lever ratio that is based on the gear ratio of the differential gear mechanism 8 that is a power input/output device that mechanically operates and connects the first and second motor generators 4 and 5 and the internal combustion engine 2.

The motor torque instruction value calculating means 48 calculates the torque instruction values of the first and second motor generators 4 and 5 using the torque balance equation including the target engine torque acquired at the target engine operating point and the electric power balance equation including the target electric power and can perform feedback correction of the torque instruction values of the first and second motor generators 4 and 5 such that the actual engine rotation speed converges on the target engine rotation speed acquired at the target engine operating point.

Accordingly, the drive control device 1 of the hybrid vehicle that calculates the target rotation speeds and the torque instruction values of the first and second motor generators 4 and 5 by using the torque balance equation including the target engine torque and the electric power balance equation including the target electric power can control the first and second generators 4 and 5 in a case where the battery 20 is charged or discharged. Both the target driving force and the target charging/discharging can be secured in consideration of the engine operating point of the internal combustion engine 2. By finely correcting the torque instruction values of the first and second motor generators 4 and 5, the engine rotation speed can converge on a target value in a speedy manner. In addition, the engine operating point can match the target operating point, whereby an appropriate operating state can be formed.

In addition, according to the drive control device 1 of the hybrid vehicle, as control of the first and second motor generators 4 and 5 in a case where the battery 20 is charged or discharged in a hybrid system including the internal combustion engine 2 and the first and second motor generators 4 and 5, in a case where control is performed in which both the target driving force and the target charging/discharging are secured in consideration of the engine operating point of the internal combustion engine 2, a torque variation of the internal combustion engine 2 is optimized so as not to influence the driving torque, whereby the drivability and the driving feeling can be improved.

In addition, in the drive control device 1 of the hybrid vehicle, an electric power loss predicting means 49 calculating the estimated power that is an electric power loss based on the target rotation speed and the torque instruction values of the first and second motor generators 4 and 5 and a target electric power calculating means 50 calculating target electric power based on a difference between the target engine power and the target driving power are arranged. The target engine power calculating means 46 calculates the target engine power based on the target driving power, the target charging/discharging power, and the estimated power that is the electric power loss, and the motor torque instruction value calculating means 48 calculates the torque instruction values of the first and second motor generators 4 and 5 using the torque balance equation including the target engine torque acquired at the target engine operating point and the electric power balance equation including the target electric power. In addition, in the electric power balance equation, the electric power that is generated or consumed by the first and second motor generators 4 and 5, the estimated power that is the electric power losses in the first and second motor generators 4 and 5, and the input/output electric power of the battery 20 are included.

From this, by limiting the input/output power according to the state of the battery 20 in consideration of the power losses in the first and second motor generators 4 and 5, the charging/discharging electric power in a case where driving assistance is performed using the electric power of the battery 20 can be appropriately limited, whereby overdischarging or overloading of the battery 20 can be prevented.

In addition, according to the drive control device 1, the control accuracy of the SOC of the battery 20 can be improved in consideration of the electric power losses in the first and second motor generators 4 and 5, and the control accuracy is high. Accordingly, a range near the limit value of the battery 20 can be used, whereby the amount of regeneration at the time of deceleration can be increased.

According to the drive control device 1, the calculation is performed with the electric power loss being included in the electric power balance equation, and accordingly, the control accuracy of the distribution of the driving force to the first and second motor generators 4 and 5 can be increased.

In addition, according to the drive control device 1, both the securement of the target driving forces of the first and second motor generators 4 and 5 and the securement of charging/discharging near the target in which overcharging/overdischarging of the battery 20 can be prevented can be acquired in consideration of the operating point of the internal combustion engine 1. In addition, according to the drive control device 1, after the target engine rotation speed is reset so as not to exceed the upper limit value of the target engine rotation speed, a target power different from the target charging/discharging power is set based thereon, and the driving forces of the first and second motor generators 4 and 5 are set based on the optimized target engine operating point and the optimal target electric power for which overcharging/overdischarging are prevented, whereby the internal combustion engine 2 is protected by limiting the engine rotation speed, and the driving force requested from the driver can be satisfied by performing power assistance using the electric power of the battery 20.

In addition, the electric power loss predicting means 49 calculates the estimated power that is the electric power loss of the first motor generator 4 using a quadratic polynomial having the target rotation speed (previous value) and the torque instruction value (previous value) of the first motor generator 4 as variables and calculates the estimated power that is the electric power loss of the second motor generator 5 using a quadratic polynomial having the target rotation speed (previous value) and the torque instruction value (previous value) of the second motor generator 5 as variables.

From this, according to the drive control device 1, the electric power loss included in the electric power balance equation is calculated with a higher accuracy and, accordingly, the accuracy of the calculation of the charging/discharging power increases, and the overdischarging and overloading of the battery 20 are prevented, whereby the control accuracy of the distribution of the driving force to the first and second motor generators 4 and 5 can be increased.

In addition, according to the drive control device 1, the power upper limit/lower limit value calculating means 51 that sets an upper limit value and a lower limit value of the electric power limiting the input/output electric power of the battery 20 based on the state parameters of the battery 20 is arranged, and the target electric power calculating means 50 calculates the target electric power based on a difference between the target engine power and the target driving force and limits the target electric power to the upper limit value or the lower limit value of the electric power when the target electric power comes off a range set by the upper limit value and the lower limit value of the electric power.

From this, according to the drive control device 1, based on the target engine power calculated in consideration of the electric power loss, the target engine operating point and the target electric power are calculated, and the torque instruction values of the first and second motor generators 4 and 5 are calculated. Accordingly, an error due to a variation of the loss of the electric power that is based on a variation of the vehicle speed or the target driving force decreases. Therefore, the control accuracy of the charge state SOC of the battery 20 is improved, and accordingly, the target driving force can be secured while the target charging/discharging is secured.

The power upper limit/lower limit value calculating means 51 determines the upper limit value and the lower limit value of the electric power by subtracting the estimated power from the retrieved value acquired from the search based on the temperature, the voltage, and the charged state as the stated parameters of the battery 20.

In other words, the power upper limit/lower limit value calculating means 51 includes the power upper limit/lower limit value search table (FIG. 17) defining the upper limit value and the lower limit value of the electric power with respect to the temperature of the battery 20, the power upper limit/lower limit value search table (FIG. 18) defining the upper limit value and the lower limit value of the electric power with respect to the voltage of the battery 20, and the power upper limit/lower limit value search table (FIG. 19) defining the upper limit value and the lower limit value of the electric power with respect to the charged state SOC of the battery 20.

The power upper limit/lower limit value calculating means 51 receives the temperature, the voltage, and the charged state SOC of the battery 20 as the state parameters of the battery 20, acquires an upper limit value and a lower limit value of the electric power defined based on the input temperature, an upper limit value and a lower limit value of the electric power defined based on the input voltage, and an upper limit value and a lower limit value of the electric power defined based on the input charge state SOC, subtracts the estimated power therefrom, compares the upper limits and the lower limits of the electric power with each other, and outputs the upper limit value and the lower limit value having the highest restrictions to the target electric power calculating means 50.

As a result, the drive control device 1 can protect the battery 20 from being applied with an excessive voltage in charging/discharging and prevent overdischarging and overcharging in consideration of the charged state SOC by limiting the input/output power according to the state of the battery 20.

INDUSTRIAL APPLICABILITY

According to the present invention, the control accuracy of the charged state of the battery can be improved in consideration of electric power losses in a plurality of motor generators, and the present invention can be applied to the control of the driving force of a hybrid vehicle.

REFERENCE SIGNS LIST 1 drive control device of hybrid vehicle
2 internal combustion engine
3 output shaft
4 first motor generator
5 second motor generator
7 driving shaft
8 differential gear mechanism
18 first inverter
19 second inverter
20 battery
21 first planetary gear mechanism
22 second planetary gear mechanism
31 one-way clutch
32 output unit
34 first rotating component
35 second rotating component
36 third rotating component
37 fourth rotating component
38 drive control unit
39 accelerator opening degree detecting means
40 vehicle speed detecting means
41 engine rotation speed detecting means
42 battery charge state detecting means
43 target driving force setting means
44 target driving power setting means
45 target charging/discharging power setting means
46 target engine power calculating means
47 target engine operating point setting means
48 motor torque instruction value calculating means
49 electric power loss predicting means
50 target electric power setting means
51 power upper limit/lower limit value calculating means
52 temperature detecting means
53 voltage detecting means

The invention claimed is:

1. A drive control device of a hybrid vehicle comprising:
an internal combustion engine that includes an output shaft;
a driving shaft that is connected to a drive wheel;
first and second motor generators;
a differential gear mechanism that includes four rotating components connected to a plurality of the motor generators, the driving shaft, and the internal combustion engine;
an accelerator opening degree detecting means for detecting the accelerator opening degree;
a vehicle speed detecting means for detecting a vehicle speed;
a battery charge state detecting means for detecting a charge state of a battery;
a target driving power setting means for setting a target driving power based on the accelerator opening degree that is detected by the accelerator opening degree detecting means and the vehicle speed detected by the vehicle speed detecting means;
a target charge/discharge power setting means for setting a target charging/discharging power based on at least the charged state of the battery that is detected by the battery charge state detecting means;
a motor torque instruction value calculating means for calculating target rotation speeds of the plurality of the motor generators and setting torque instruction values of the motor generators;
an electric power loss predicting means for calculating an estimated power that is an electric power loss based on the target rotation speeds of the plurality of the motor generators and the torque instruction values of the plurality of the motor generators;
a target engine power calculating means for calculating a target engine power based on the target driving power, the target charging/discharging power and the estimated power that is an electric power loss;
a target electric power calculating means for calculating a target electric power based on a difference between the target engine power and the target driving power; and
a target engine operating point setting means for setting a target engine operating point based on the target engine power and total system efficiency;
wherein the motor torque instruction value calculating means calculates torque instruction values of the plurality of motor generators using a torque balance equation including target engine torque acquired at the target engine operating point and an electric power balance equation including the target electric power, and
electric power generated or consumed by the plurality of the motor generators, the estimated power that is the electric power loss in the plurality of motor generators, and input/output electric power of the battery are included in the electric power balance equation.

2. The drive control device of the hybrid vehicle according to claim 1, wherein the electric power loss predicting means calculates the estimated power that is the electric power loss of the first motor generator using a quadratic polynomial having a target rotation speed and a torque instruction value of the first motor generator as variables, and calculates the estimated power that is the electric power loss of the second motor generator using a quadratic polynomial having a target rotation speed and a torque instruction value of the second motor generator as variables.

3. The drive control device of the hybrid vehicle according to claim 1, further comprising a power upper limit/lower limit value calculating means for setting an upper limit value of the electric power and a lower limit value of the electric power limiting input/output electric power of the battery based on the battery state parameters, wherein the target electric power calculating means calculates the target electric power based on a difference between the target engine power calculated by the target engine power calculating means and the target driving power and limits the target electric power to the upper limit value of the electric power or the lower limit value of the electric power when the target electric power comes off a range set by the upper limit value of the electric power and the lower limit value of the electric power.

4. The drive control device of the hybrid vehicle according to claim 3, wherein the power upper limit/lower limit value calculating means determines the upper limit value of the electric power or the lower limit value of the electric power by subtracting the estimated power from a retrieved value acquired through a search from a search table based on the temperature, the voltage, and the charge state as the battery parameters.

* * * * *